Figure 1:
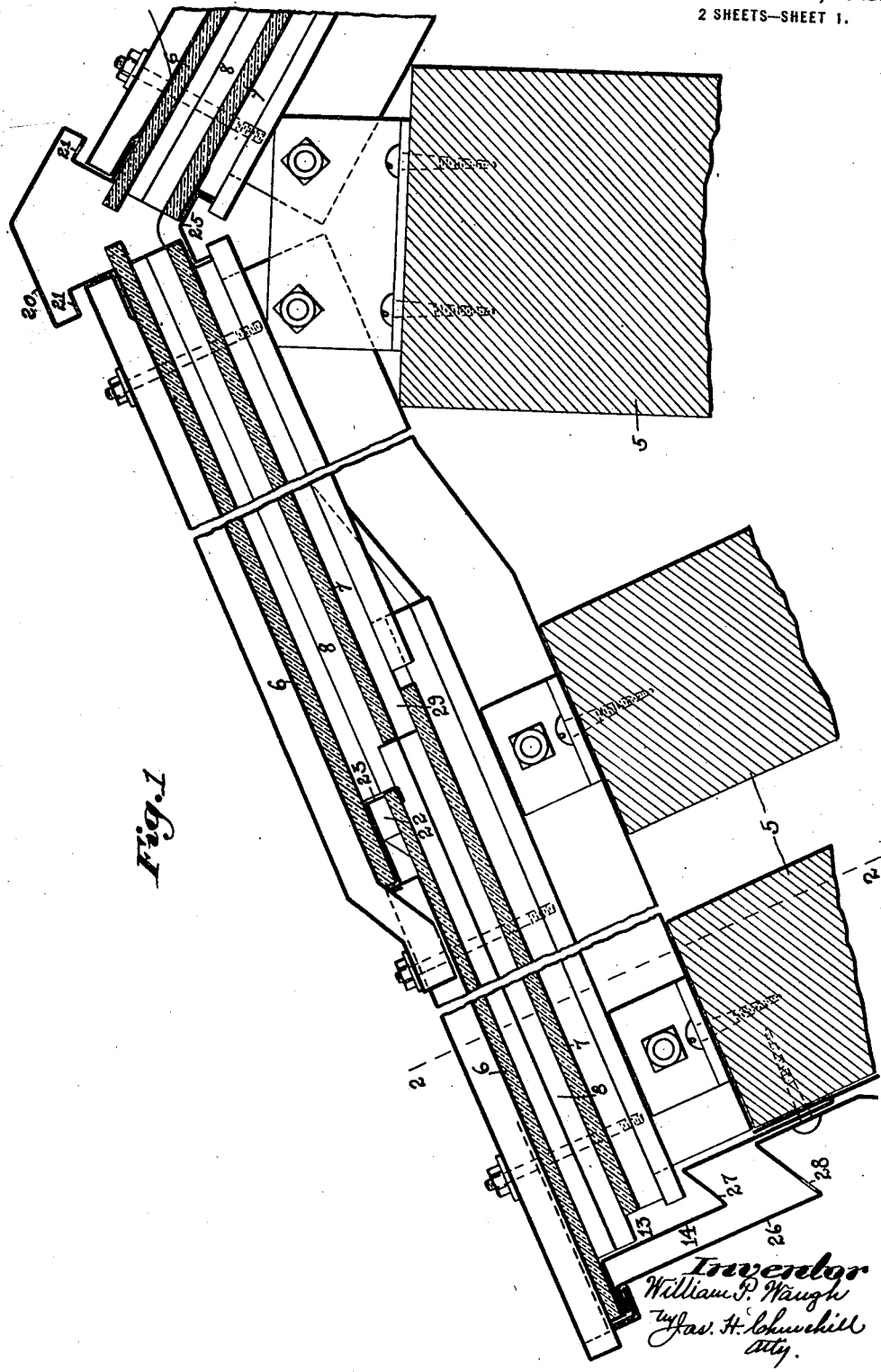

W. P. WAUGH.
GLAZING CONSTRUCTION.
APPLICATION FILED SEPT. 8, 1917.

1,280,913.

Patented Oct. 8, 1918.
2 SHEETS—SHEET 2.

Inventor:
William P. Waugh
by Jas. H. Churchill
atty.

UNITED STATES PATENT OFFICE.

WILLIAM P. WAUGH, OF SEWICKLEY, PENNSYLVANIA, ASSIGNOR TO ASBESTOS PROTECTED METAL COMPANY, OF PITTSBURGH, PENNSYLVANIA, A CORPORATION OF PENNSYLVANIA.

GLAZING CONSTRUCTION.

1,280,913.  Specification of Letters Patent.  Patented Oct. 8, 1918.

Application filed September 8, 1917.  Serial No. 190,301.

*To all whom it may concern:*

Be it known that I, WILLIAM P. WAUGH, a citizen of the United States, and a resident of Sewickley, in the county of Allegheny and State of Pennsylvania, have invented an Improvement in Glazing Construction, of which the following description, in connection with the accompanying drawings, is a specification, like characters on the drawings representing like parts.

This invention relates to a building construction and is especially adapted among other uses to be employed in the construction of the roofs and skylights for paper mills, dye houses and similar buildings within which the moisture content of the air is normally high.

The invention has for its object to provide a building construction which will effectively overcome the moisture condensation troubles which now exist, when any of the roofing or glazing constructions known to me are employed on such buildings.

When any of the present known types of roofing or glazing construction are installed on such buildings as paper mills, dye-houses and the like, within which the moisture content of the air is normally high, there occurs in winter time especially, excessive moisture condensation upon the underside of the roof, and as the condensed moisture collects, it soon drops into the building below, often ruining the paper or dyes or other material, which may be within the building.

Attempts have been made to overcome this difficulty in some instances by using highly thermally insulated roofs, but owing to the fact that the air within the building is usually very near the point of saturation, a moderate decrease in the temperature of the underside of the roof is sufficient to cause precipitation of a considerable amount of moisture thereupon. Another attempt to overcome this difficulty consisted in using what is commonly known as a dead air space in glazing construction.

For this purpose, a body of stationary air was confined between an upper glass member and a lower parallel glass member spaced a short distance below the upper member.

This construction depended entirely on the insulating value of the double glass construction separated by the confined and stationary body of air, which for reasons pointed out in the cases of highly insulated roofs above, could not be successful in those cases where the air within the building approached the saturation point.

This construction is open to the further objection that when the temperature of the dead air drops, it contracts and a partial vacuum is produced in the dead air space. This causes broken glass or the infiltration of highly moist air from within the building through the putty surrounding the glass, with the immediate precipitation of moisture within the dead air space and the freezing and subsequent cracking of the glass members themselves.

In accordance with the present invention, the roof or glazing construction consists of substantially parallel superimposed members spaced apart and forming a conduit, which is provided with an air inlet communicating with the interior of the building and is further provided with an air outlet port communicating with the exterior of the building. The substantially parallel superimposed members spaced apart coöperate with the supporting members and with other parts of the building to form the conduit referred to, so that at most all times, and especially when the temperature within the building is higher than that outside, there is created a draft or current of heated air from the inside of the building through the conduit and along the underside of the upper roofing member. This condition greatly decreases the moisture condensation on the underside of the upper roof member and prevents or reduces to a minimum condensation on the underside of the lower roofing member in a manner as will be pointed out.

This invention when employed in skylight construction as herein shown, also effectively prevents breakage of the glass members due to the freezing of moisture between the same, and also prevents as will be described moisture that may condense on the upper member from dropping into the building itself, and consequently lends itself particularly for use in those buildings wherein perishable material is manufactured.

These and other features of this invention will be pointed out in the claims at the end of this specification.

Figure 2:
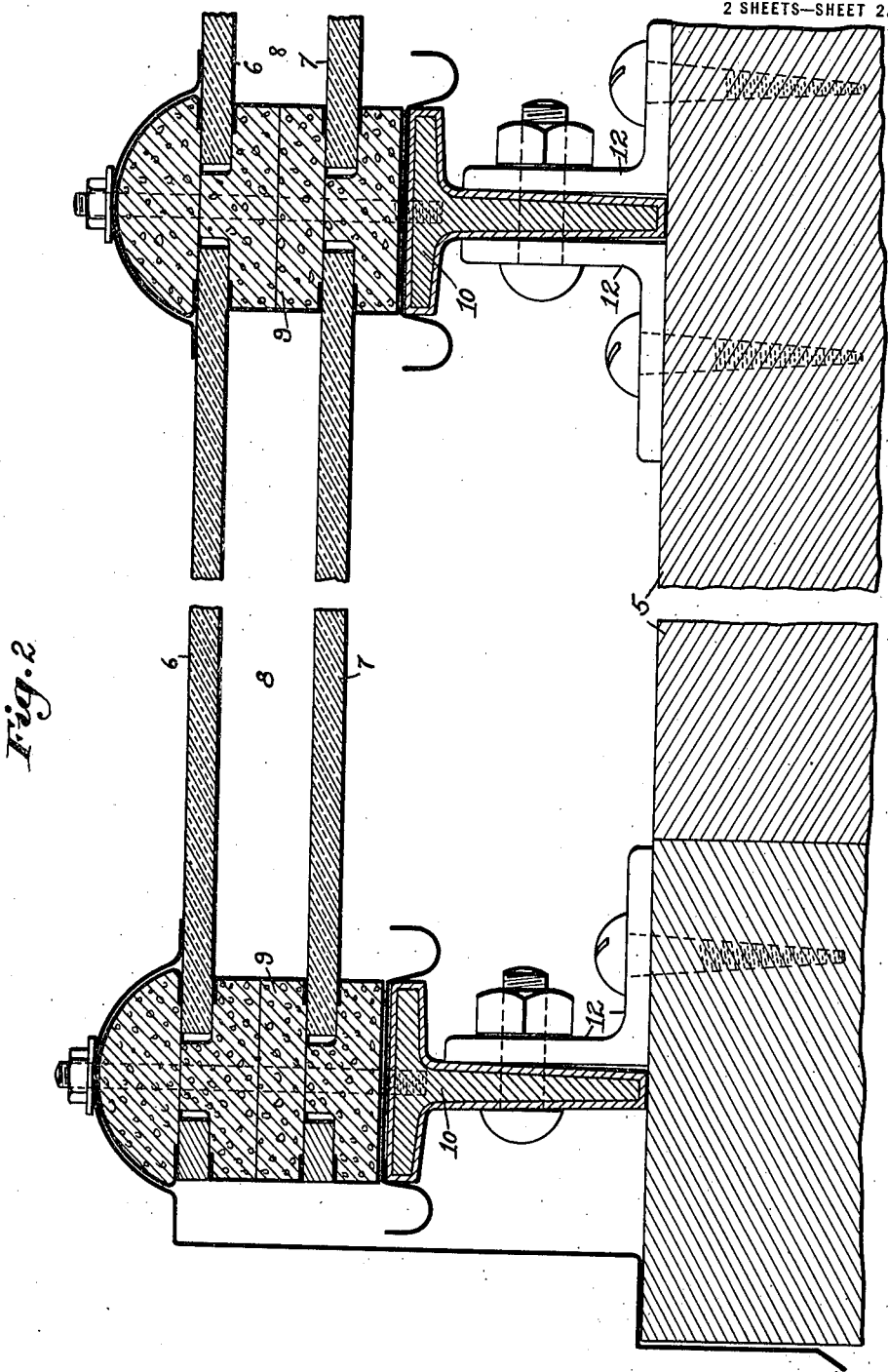

Figure 1 represents in section and elevation a sufficient portion of a building embodying the invention to enable it to be understood, and Fig. 2, an enlarged section on line 2—2, Fig. 1.

Referring to the drawing, 5 represents the roof purlins of a building, which support a roof construction, herein represented as a skylight construction comprising an upper glass member 6, and a substantially parallel lower glass member 7, separated by a space 8.

In the present instance, the glass members 6, 7, are supported at their sides by suitable devices 9 (see Fig. 2), which extend from the eave to the ridge of the roof. The supporting devices 9 are preferably of cushioning or yielding material, such as commonly employed in glazing constructions, and rest upon metal members 10, which are fastened to the purlins 5 by angle irons 12 or other suitable means. The space 8 in accordance with the present invention communicates with the interior of the building, represented by the purlins 5, through a port or opening 13 (see Fig. 1) formed as herein shown by the lower glass member 7 and a flashing 14 of suitable or usual material and construction.

The upper glass member 6 extends beyond the lower glass member and coöperates with the flashing 14 to cut off communication between the lower end of the space 8 and the exterior of the building.

In Fig. 1, the upper and lower glass members 6, 7, are shown as composed of a plurality of sections arranged in terraced effect, but the spaces 8 between the members 6, 7, are in open communication with one another and from an air conduit, which is in open communication at its lower end with the interior of the building through the port 13 and is in open communication at its upper end with the ridge cap 20, such as now commonly used in building constructions, and which cap is in open communication with the atmosphere through suitable ports or openings 21 therein.

The space 22 between adjacent terraced sections of the upper glass member 6 is closed by a suitable flashing 23 or otherwise so that the upper glass member is practically continuous and forms an unbroken upper wall or member for the conduit extending from near the eave to the ridge cap of the building and which communicates at one end with the interior of the building and at its other end with the exterior of the building through the ridge cap and the openings 21 therein.

The conduit 8 at its upper end is cut off from the interior of the building by a suitable flashing 25 or otherwise.

In the present instance, two flashings 14, 26, are shown at the eaves of the building, which are provided with substantially small water outlets or weep holes 27, 28.

The space 29 between the sections of the lower glass member 7 of the conduit 8 may be closed by a flashing similar to the flashing 23 or as may be preferred, said space may be left open to form an additional air inlet for the conduit 8 between the ends of the latter.

It will be understood that the roof of the building is made up of a series of the conduits 8, which in the building herein represented are arranged side by side and are inclined upwardly from the lower portion of the roof to the ridge.

The manner in which this type of construction eliminates and controls the condensation of moisture upon the underside of the roof may be described as follows: By providing the series of conduits 8, each communicating with the interior of the building at one point, and also with the exterior of the building at another point, a strong current of heated air continually passes through the said conduit from the interior to the outside of the building, and in the construction herein shown from the eaves to the ridge. In this manner, the upper and lower surfaces of the lower glass member 7, are maintained at a temperature practically that of the interior of the building, and consequently the temperature of the air directly in contact with said lower member is not liable to decrease to a point below the saturation temperature, and consequently condensation will not occur to any material amount at least on either the lower or upper surfaces of the lower glass member.

The air directly in contact with the lower surface of the upper glass members 6, may in those instances when the external temperature becomes very low, be lowered below the saturation point with subsequent condensation on this lower surface of the glass member 6, but in these instances the inclined conduit 8 furnishes a ready conductor for the moisture to the weep holes 27, 28, in the side flashings 14, 26, from which the small amount of moisture can drip, or if desired be taken away by suitable drains or pipes, not shown, in a manner well understood.

The tendency for accumulation of this condensation even under the extremely low temperature conditions above referred to, is greatly diminished by the counter current flow of warm air in the conduit 8, which picks up a large percentage of the moisture that may have condensed on the under surface of the upper member 6, and carries the same into the ridge cap and through the outlets 21 therein to the exterior of the building.

In the type of construction embodying this invention, whether the roofing materials be glass, iron or any similar material, it will be seen that the interior surface of the under member is free or substantially free from condensation and consequently any perishable material contained within the building is free or substantially free from contamination or injury by condensed moisture dripping from the under roof member.

The elimination of moisture condensation in those types of buildings where steel or iron is employed as the roofing material serves to greatly prolong the life of the material itself, and consequently the life of the building, and therefore while the invention is particularly adapted to be embodied in a skylight construction, it is not desired to limit the invention in this respect.

The substantially parallel members 6, 7, are herein shown as forming a section of the building, to wit:—the roof thereof, but it is not desired to limit the invention in this respect, as they may form other sections of the building, for instance, a wall thereof.

Claims.

1. In a building construction, a roof having superimposed members spaced apart to form an air conduit which is provided with an air inlet communicating with the interior of the building and with an air outlet communicating with the exterior of the building to enable air within the building to flow through said conduit to the outside of the building, and means coöperating with the lower member of said conduit at the upper end thereof to cut off communication between the interior of the building and the upper end of said conduit.

2. In a building construction, a roof provided with a ridge cap having an opening communicating with the exterior of the building and provided with superimposed members spaced apart to form an air conduit, which is provided at one end with an air inlet communicating with the interior of the building and having an air outlet communicating with the exterior of the building through said ridge cap, and means for cutting off the said ridge cap and the upper end of the conduit from the interior of said building.

3. In a building construction, a roof having superimposed members spaced apart to form an air conduit, the upper member of which comprises sections arranged to form a closed or substantially unbroken member and the lower member of which comprises sections spaced apart to form an air inlet connecting said conduit with the interior of the building between the ends of said conduit, and having an air outlet at its upper end communicating with the exterior of the building and cut off from the interior thereof.

4. In a building construction, a roof having superimposed members spaced apart to form a conduit, the upper members of which are continuous and the lower members of which are spaced apart to form a plurality of air inlets connecting said conduit with the interior of the building, and a ridge cap closed at its bottom and having an air outlet connecting with the said conduit.

5. In a building construction, a roof having a ridge cap and superimposed members inclined downward from opposite sides of said ridge cap and separated to form air conduits, having air inlets at their lower ends which communicate with the interior of the building and having air outlets at their upper ends communicating with said ridge cap and through the latter with the exterior of the building, and means for cutting off communication between the upper end of said conduit and the interior of said building through said ridge cap.

In testimony whereof, I have signed my name to this specification.

WILLIAM P. WAUGH.